United States Patent [19]

Tange

[11] Patent Number: 5,673,405
[45] Date of Patent: Sep. 30, 1997

[54] ICON RELOCATION SYSTEM AND METHOD THEREOF

[75] Inventor: Kouichi Tange, Mitaka, Japan

[73] Assignee: Tokyo Seimitsu Co., Ltd., Mitaka, Japan

[21] Appl. No.: 606,445

[22] Filed: Feb. 23, 1996

Related U.S. Application Data

[63] Continuation of Ser. No. 141,938, Oct. 28, 1993, abandoned.

[30] Foreign Application Priority Data

Dec. 8, 1992 [JP] Japan ..................... 4-327913

[51] Int. Cl.$^6$ ..................................... G06F 3/14
[52] U.S. Cl. ................... 395/348; 395/352; 395/333
[58] Field of Search ........................ 395/326, 348, 395/349, 350, 351, 352, 353, 354, 355, 356, 357

[56] References Cited

U.S. PATENT DOCUMENTS

| | | | |
|---|---|---|---|
| 4,901,256 | 2/1990 | McMurtry et al. | 364/560 |
| 5,016,199 | 5/1991 | McMurtry et al. | 364/560 |
| 5,226,118 | 7/1993 | Baker et al. | 395/161 |
| 5,235,679 | 8/1993 | Yoshizawa et al. | 395/156 |
| 5,291,587 | 3/1994 | Kodosky et al. | 395/500 |
| 5,301,336 | 4/1994 | Kodosky et al. | 395/800 |
| 5,345,550 | 9/1994 | Bloomfield | 395/156 |
| 5,367,626 | 11/1994 | Morioka et al. | 395/159 |

FOREIGN PATENT DOCUMENTS

| | | |
|---|---|---|
| 427264 | 11/1990 | European Pat. Off. |
| 3805500 | 9/1988 | Germany. |
| 4011067 | 10/1990 | Germany. |
| 2114318 | 4/1990 | Japan. |

*Primary Examiner*—Thomas G. Black
*Assistant Examiner*—Ruay Lian Ho
*Attorney, Agent, or Firm*—Sixbey, Friedman, Leedom & Ferguson, P.C.; David S. Safran

[57] ABSTRACT

An icon relocation system and a method relocating method applied to a three-dimensional coordinates measuring machine having measurement programs for performing various measurements and measuring based on a specified measurement program. The icon menu table indicating the various measurements is divided into groups from a first group to last group and is read out from an external storage medium. The respective icons of the selected icon menu are displayed on a display in a row by selecting one group from the read-out icon menu table, and further, the measurement program is selected by selecting an icon from among an icon group displayed on the display. The utilization frequency of each icon is counted based on the icon selection, and the icon menu table is edited so as to locate an icon with a high utilization frequency in a high group. And, the edited icon menu table is memorized in the storage media.

10 Claims, 4 Drawing Sheets

FIG. 4

|   | ① | ② | ③ | ④ |
|---|---|---|---|---|
| A | 50 | 50 | 50 | 50 |
| B | 40 | 40 | 40 | 40 |
| C | 30 | 30 | 30 | 30 |
| D | 20 | 20 | 20 | 20 |
| E | 10 | 10 | 10 | 10 |

FIG. 5

|   | ① | ② | ③ | ④ |
|---|---|---|---|---|
| A | 0 | 0 | 0 | 0 |
| B | 0 | 0 | 0 | 0 |
| C | 0 | 0 | 0 | 0 |
| D | 0 | 0 | 0 | 0 |
| E | 0 | 0 | 0 | 0 |

ICON RELOCATION SYSTEM AND METHOD THEREOF

This application is a continuation, of application Ser. No. 08/141,938, filed Oct. 28,1993, abandoned.

BACKGROUND OF THE INVENTION

1. Field of the Invention

The the present invention relates to an icon relocation system and a method thereof, more particularly, to the icon relocation system and the method thereof applied to a three-dimensional coordinates measuring machine capable of various measurements.

2. Description of the Related Art

Generally, a three-dimensional coordinates measuring machine (3-D CMM) is capable of various measurement based on general-purpose measurement programs. That is, a desired icon (pictograph) is selected from an icon menu which shows measurement contents and the like, whereby, the measurement menu indicated thereby is performed by the 3-D CMM.

On the other hand, the display parts, which display the icon menu in one row, are limited in number compared with the total of the icon menu (for instance, there are 10 parts.)

So conventionally, the icon menu is divided into the first row, the second row . . . and the Nth row, and then the respective icon menus from the first row to the Nth row are displayed on the icon menu display part one by one. Incidentally, the icon menus are arranged in accordance with the previously utilized frequency, so that the most useful menu is placed in the first row.

However, there is a problem in that it is not always easy for the user to use the icon menu as regards the location fixed by the maker, for instance, when the most useful measurement menu is not contained in the first row of the icon menu, the user must look for the desired icon in the lower rows.

SUMMARY OF THE INVENTION

The present invention has been developed to eliminate the above-described problem and aims at the provision of an icon relocation system and a method thereof wherein icons can be relocated automatically according to high utilization frequency and an icon menu can easily be used.

To achieve the above-mentioned aim, An icon relocation system applied to a three-dimensional coordinates measuring machine having measurement programs for performing various measurements and measuring based on a specified measurement program, comprising: an external storage medium for memorizing a icon menu table divided into first group, second group . . . Nth group; a read-out means for reading out the icon menu table from said storage medium; a group selection means for selecting an icon menu in one of the groups from the first group to the Nth group of the icon menu table; a display means for displaying respective icons of selected icon menu based on the icon menu in a selected group; a icon selection means for selecting an icon from among from a group of the icons displayed on said display means so as to select a measurement program; counters for counting respective icon utilization frequency, in which a counter corresponding to a selected icon is counted up whenever the icon is selected by said icon selection means; an editing means for editing said icon menu table so as to locate an icon with high utilization frequency in a high group based on respective counter values of said counters; and, an entry means for memorizing the edited icon menu table into said storage medium.

According to the present invention, the first group of the icon menus is displayed on the display means based on the icon-menu table which indicates multiple icons divided into the first group, the second group . . . the Nth group with an external storage medium and a lower group is selected and brought forward by the group selection means so as to display the selected group on the display means, as a result, a system, in which a measurement menu is selected from the icon menu displayed on the display means by the menu section means so as to make the 3-D CMM start the measurement corresponding to the measure menu, is provided with a counter corresponding to the icon menu table, and then when an icon is selected, the utilization frequency of the measurement menu, which the selected icon indicates, is added and registered in the counter. And, the icon menu table is rearranged, so that the icons are relocated according to the high utilization frequency automatically based on the storage contents in the counter. Then, the edited icon-menu table is recorded in the storage medium. Therefore, the system can be operated with the original icon menu adjusting to the user.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts through the figures thereof and wherein:

FIG. 4 is a view showing the initial state of the icon point table provided corresponding to the icon menu table.

FIG. 5 is a view showing the initial state of the icon utilization frequency table provided corresponding to the icon menu.

DESCRIPTION OF THE PREFERRED EMBODIMENT

Detail description will hereunder be given of the preferred embodiment of an icon relocation system and a method thereof according to the present invention with reference to the accompanying drawings.

Figure 1:
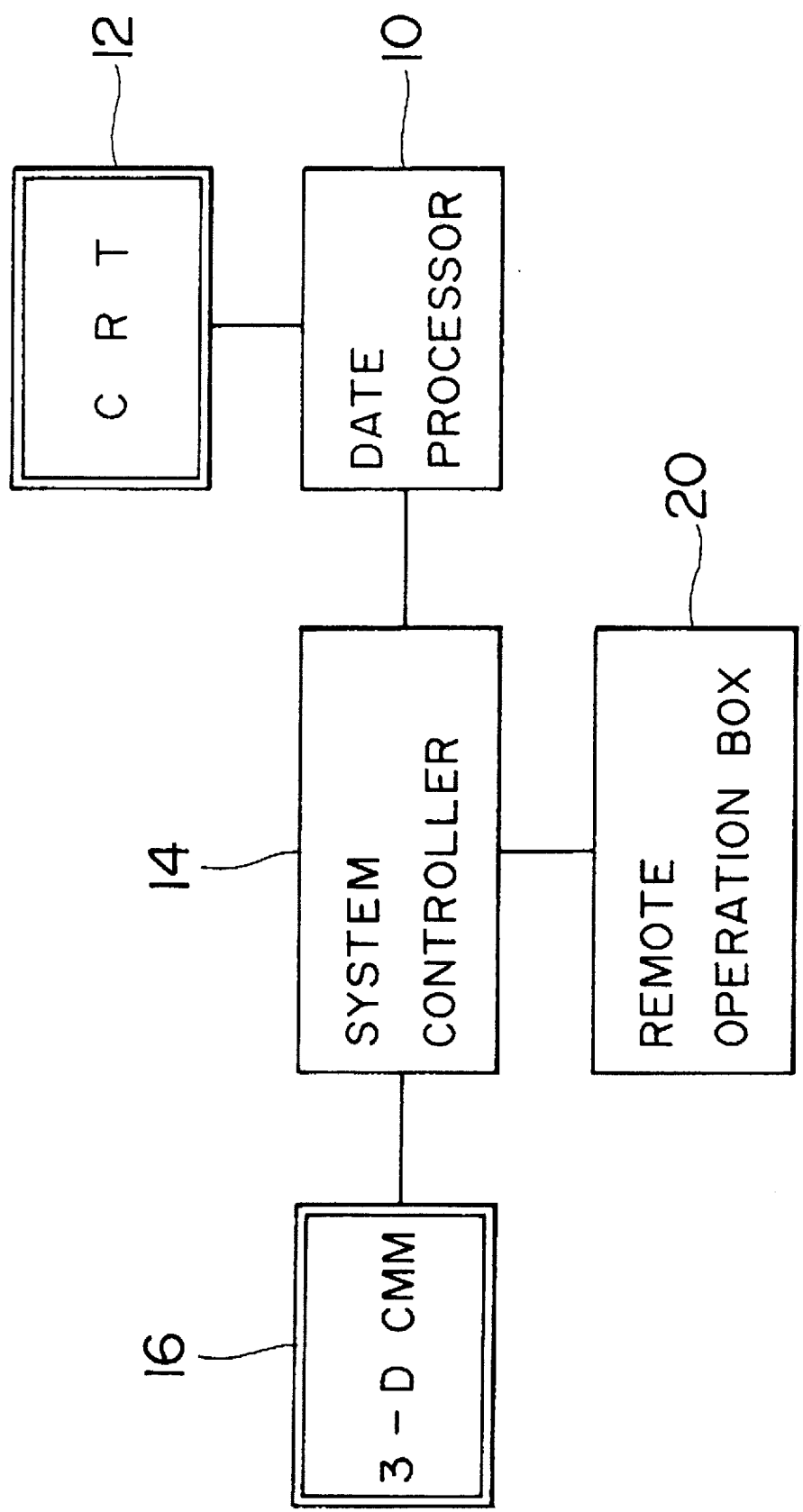
FIG. 1 is a block diagram showing the icon relocation system according to the present invention.

In FIG. 1, an icon relocation system consists of a data processor 10, a cathode ray tube (CRT) 12, a system controller 14, a three-dimensional coordinates measuring machine (3-D CMM) 16 and a remote operation box 20.

The data processor 10 is provided with I/O devices for external storage media such as a microprocessor, a numeric operation processor, an internal storage device, a disk and a floppy disk, and the like, and is connected with peripherals such as the CRT display 12, a printer not shown and the like. Moreover, the general-purpose measurement program, which includes the CNC (computerized numeric control) measurement function program, the geometric deviation automatic measurement/plotting program, the icon relocation program according to the present invention and the like, is memorized in said internal storage device. Incidentally, a multiplicity of icon menu tables divided into the first row, the second row, . . . the Nth row which have about ten icon menus respectively, and the like are memorized in disks and/or floppy disks. Moreover, measurement results and the like are displayed on the CRT display 12.

Figure 2:
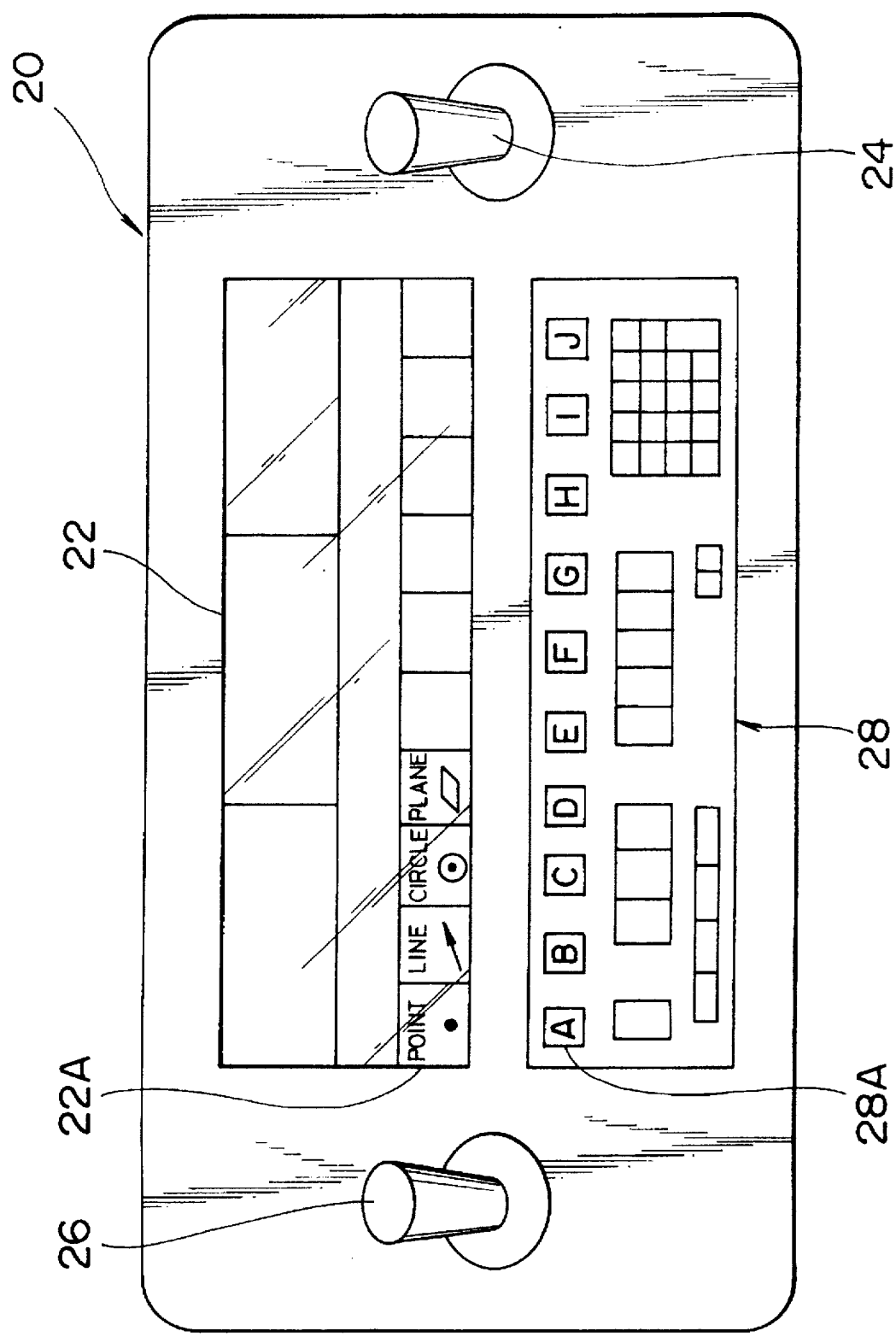
FIG. 2 is a plan view showing the remote operation box in FIG. 1 in detail.

The remote operation box 20 has a display 22, a joystick 24 for X and Y-axis, a joystick 26 for Z-axis and an operation key 28 including ten icon selection keys 28A, as shown in FIG. 2. The LCD (liquid crystal display) 22 is provided with an icon display part 22A and display parts for counter values in X, Y and Z-axis, measurement information and messages necessary for operation.

The general-purpose measurement program in the data processor 10 is used for the size measurement such as the calculations for each part size, angles, positions of a work to be measured and the like, and is performed by instructions from the remote operation box 20. That is, a desired measurement menu is selected from the icon menus displayed on the icon display part 22A in the LCD 22 on the remote operation box 20 with the icon selection key 28A, and as a result, the measurement is begun. Then, dialogic operation can be performed, and information necessary for the measurement such as input points and the like and measurement results can be confirmed on the LCD 22. Moreover, in the 3-D CMM 16, a probe is moved to the measurement position through the system controller 14 according to the measurement menu and the operations by the joystick 24 for X-Y axis and by the joystick 26 for Z axis. Incidentally, icons (about 10 items) in one row are displayed on the icon display part 22A based on the icon menu table memorized on said disk and/or said floppy disk, and further, an unspecified row can be displayed on the icon display part 22A one by one according to the operation in which a row not shown is selected with the operation key.

Next, the explanation will be given of the process of relocating the icons in the icon menu table automatically. The icon relocation is performed by the data processor 10 built into the icon relocation program.

Figure 3:
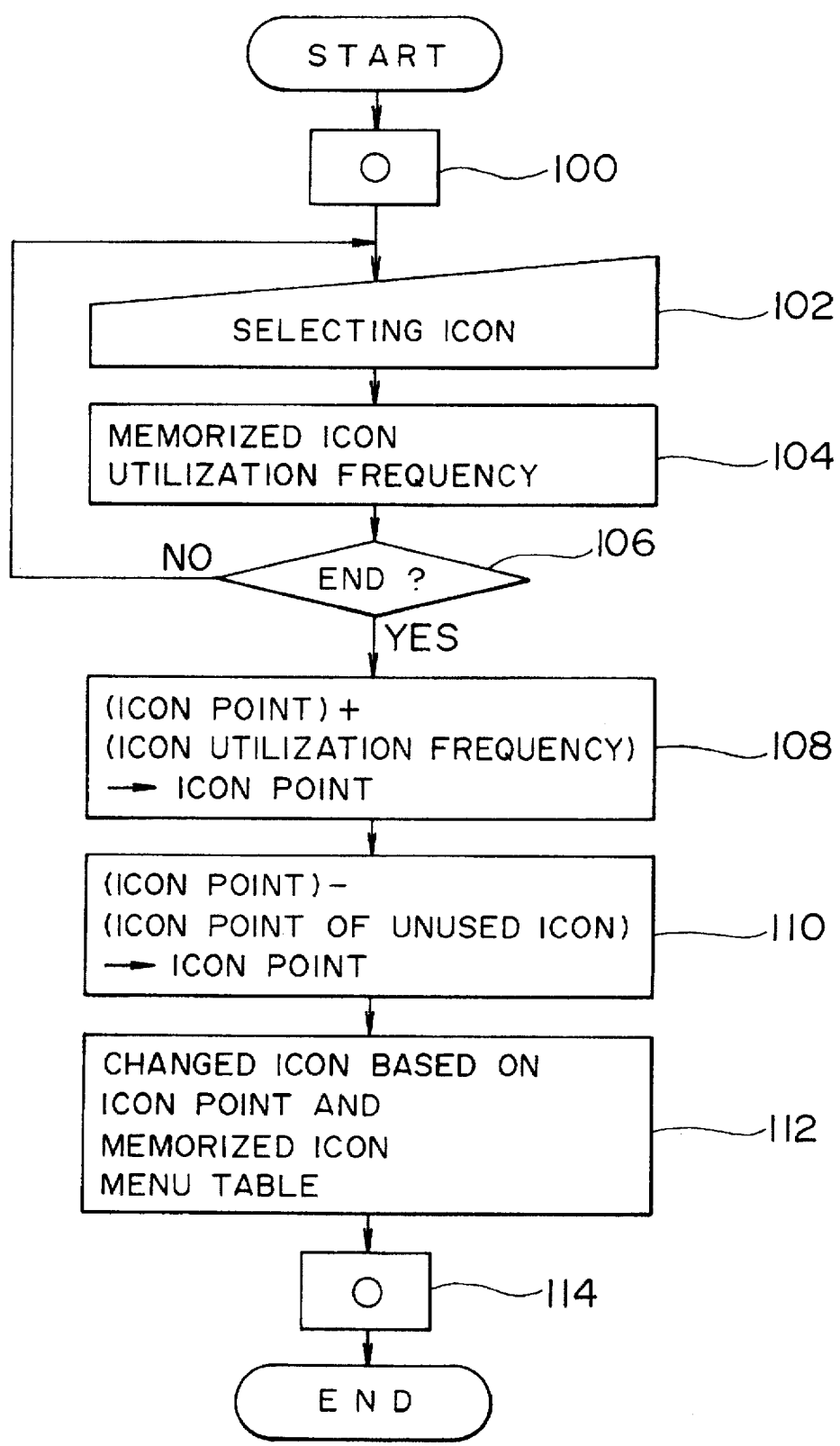
FIG. 3 is a flowchart showing the icon relocation function and the operation at the data processor in FIG. 1.

FIG. 3 is a flowchart showing the icon relocation function and the operation. FIGS. 4 and 5 are views showing the icon point table and the icon utilization frequency table provided corresponding to the icon menu table, respectively. Icon points (standard icon utilization frequency) for providing each row with a gap have been previously memorized in the icon point table. Moreover, the icon utilization frequency table is reset at zero as shown in FIG. 5 since all icons are not used before the 3-D CMM is started.

When the 3-D CMM is started for the first time, the data processor 10 reads out the icon menu and the icon point from disks and/or floppy disks in which the icon menu edited automatically are memorized, as shown in FIG. 3 (Step 100).

An operator selects a desired measurement menu from among the icon menus displayed on the icon display part 22A in 22 the display of the remote operation box 20 with the icon selection key 28A (when the desired measurement menu is not included in the icon menus, it is selected from among the low icon menus displayed one by one according to the operation of the operation key by which the rows are selected) (Step 102). With this icon selection, the measurement indicated by the icon is started and the count value of the icon utilization frequency table corresponding to the icon is counted up. For instance, when the icon (A,①) is selected in FIG. 5, the utilization frequency value of the icon (A,①) is rewritten from 0 to 1 (Step 104).

Next, it is judged whether the program has ended or not (Step 106), and the above steps 102–104 are repeated until the program has ended. As a result, the count value corresponding to the utilization frequency of each icon is memorized in the icon utilization frequency table.

On the other hand, when the program is finished, the icon point in the icon point table (FIG. 4) and the icon utilization frequency memorized in the icon utilization frequency table (FIG. 5) are added up, and then the icon point is updated based on the result (Step 108).

And, an icon point, is subtracted for each icon that was not used for running the program (Step 110). The icons are distinguished between high and low utilization frequencies after the above-mentioned addition and subtraction.

The icons are relocated in step 112 referring to the icon point calculated as above (step 112). For instance, an icon point, which exceeds a standard frequency (see FIG. 4) in the next higher level among the low row, becomes an object for the icon relocation, and an icon having a maximum point among objects and an icon having a minimum point among the next higher level are changed.

When the above-mentioned icon relocation is completed, the relocated icon menu table is stored in the disk and/or the floppy disk (Step 114). Therefore, an icon with high utilization frequency is moved to the higher row gradually and an icon with low utilization frequency is moved to the low row gradually, thereby an original icon menu corresponding to the utilization frequency is automatically made.

Incidentally, a case is shown in FIGS. 4 and 5, in that four icons are contained in one row and five rows A–E are arranged for explaining briefly. Moreover, the icon menu table edited as described above can be displayed on the display 22 in the remote operation box 20 in order of A, B, C, D, and E cyclically, and when the icon is selected by the remote operation box 20, the measurement according to the icon can be performed. At this time, the icon with high utilization frequency is displayed first, therefore, it will not be necessary to search through the low row for the icon to be used, whereby the operation becomes simple and easy to use.

The description has been given of the embodiment in that the count of the icon utilization frequency is stopped at the end of the program, however, this invention is not so limited. For instance the count may be stopped at the time after a predetermined measurement-time or at the time when the total of the icon utilization frequency reaches a predetermined value. Moreover, in this embodiment, the differential between high and low rows is provided to avoid very often icon relocation for easy use; however, this invention is not so limited, and any system which relocates icons based on the utilization frequency may be applied.

As has been described hereinbefore, in the icon relocation system and the method thereof according to this invention, the icon menu relocation can be automatically performed based on the icon utilization frequency, whereby, an original icon menu suitable for an user can be made while using. Therefore, the arrangement of the icon menu becomes easy to use though the user is not aware. Moreover, when several users operate one 3-D CMM, icon menus are loaded and saved, whereby, the users can operate with respective original icon menus. Further, there is an advantage in that another CMM set up in another place can be operated with the loaded original icon menu as for the same type 3-D CMM.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An icon relocation system applied to a three-dimensional coordinates measuring machine having measurement programs for performing various measurements and measuring based on a specified measurement program, comprising:

an external storage medium for memorizing an icon menu table divided into a first group of icons, second group of icons . . . last group of icons;

a read-out means for reading out the icon menu table from said storage medium;

a group selection means for selecting an icon menu in one of the groups from the first group to the last group of the icon menu table;

a display means for displaying respective icons of the selected icon menu based on the icon menu in the selected group;

a icon selection means for selecting an icon from a group of the icons displayed on said display means so as to select a measurement program;

counters for counting respective icon utilization frequency, in which a counter corresponding to a selected icon is counted up whenever the icon is selected by said icon selection means;

an editing means for editing said icon menu table so as to relocate icons from group to group on the basis of icon utilization with icons with high utilization frequency being located in a high group and icons of lower utilization frequency being located in a lower icon group based on respective counter values of said counters; and, an entry means for memorizing the edited icon menu table into said storage medium.

2. The icon relocation system as set forth in claim 1, wherein, said display means displays the icon menu of the first group in said icon menu table in a row when said three-dimensional coordinates measuring machine is started, and further displays the icon menus of the groups in an arrangement going from a higher group to a successive lower group whenever said group selection means is operated.

3. The icon relocation system as set forth in claim 1, wherein, a counter corresponding to an icon which has not been used is counted down and said editing means uses a value from which a predetermined value is subtracted as a counter value of said counter.

4. The icon relocation system as set forth in claim 1, wherein, said editing means edits at an end of all measurements in said three-dimensional coordinates measuring machine.

5. The icon relocation system as set forth in claim 1, wherein, said editing means edits after a predetermined measurement time in said three-dimensional coordinates measuring machine.

6. The icon relocation system as set forth in claim 1, wherein, said editing means edits whenever a total of the utilization frequency of the icons reaches a predetermined value.

7. An icon relocation method applied to a three-dimensional coordinates measuring machine having measurement programs for performing various measurements and measuring based on a specified measurement program, comprising:

reading out an icon menu table indicating said various measurements and divided into a first group to a last group from an external storage medium;

displaying respective icons of selected icon menu on a display means by selecting one group from the icon menu table which is read out;

selecting a measurement program by selecting an icon among from a group of the icons displayed on said display means;

counting up a counter corresponding to a selected icon whenever the icon is selected;

editing said icon menu table so as to relocate icons from group to group on the basis of icon utilization with icons with high utilization frequency being located in a high group and with icons with lower utilization being located in a lower group based on respective counter values of said counters;

memorizing said icon menu table which has been edited in said storage medium.

8. The icon relocation method as set forth in claim 7, wherein, said editing is performed at an end of all measurements in said three-dimensional coordinates measuring machine.

9. The icon relocation method as set forth in claim 7, wherein, said editing is performed after a predetermined measurement time in said three-dimensional coordinates measuring machine.

10. The icon relocation method as set forth in claim 7, wherein, said editing is performed whenever a total of the utilization frequency of the icons reaches a predetermined value.

* * * * *